(12) United States Patent
Barnes et al.

(10) Patent No.: US 8,719,521 B1
(45) Date of Patent: May 6, 2014

(54) CRASH-TOLERANT INCREMENTAL CHANGE TRACKING BETWEEN BACKUPS OF A SOURCE STORAGE

(71) Applicant: Storagecraft Technology Corp., Draper, UT (US)

(72) Inventors: Scott Barnes, Draper, UT (US); Maxim Shatskikh, Moscow (RU); Nathan S. Bushman, Pleasant Grove, UT (US)

(73) Assignee: Storagecraft Technology Corporation, Draper, UT (US)

( * ) Notice: Subject to any disclaimer, the term of this patent is extended or adjusted under 35 U.S.C. 154(b) by 0 days.

(21) Appl. No.: 14/063,046

(22) Filed: Oct. 25, 2013

(51) Int. Cl.
*G06F 3/06* (2006.01)

(52) U.S. Cl.
CPC .............. *G06F 3/065* (2013.01); *G06F 3/0619* (2013.01); *G06F 3/067* (2013.01)
USPC .......................................... 711/161; 707/639

(58) Field of Classification Search
USPC .......................................... 711/161; 707/639
See application file for complete search history.

(56) References Cited

U.S. PATENT DOCUMENTS

| 7,328,226 B1* | 2/2008 | Karr et al. .............................. 1/1 |
| 2011/0082834 A1* | 4/2011 | Murayama et al. ........... 707/640 |

* cited by examiner

*Primary Examiner* — Jared Rutz
(74) *Attorney, Agent, or Firm* — Maschoff Brennan

(57) ABSTRACT

Crash-tolerant incremental change tracking between backups of a source storage. In one example embodiment, a method of crash-tolerant incremental change tracking between backups of a source storage includes assigning each block in a source storage into one of multiple zones, with each of the zones including multiple of the blocks, creating, in a nonvolatile storage, a nonvolatile zone map that represents each of the zones, and tracking, in the nonvolatile zone map, each of the zones that is changed between a first point in time and a second point in time. Each of the zones is marked as changed in the nonvolatile zone map upon the first receipt of a request to write to any of the blocks of the zone and prior to execution of the write request.

21 Claims, 13 Drawing Sheets

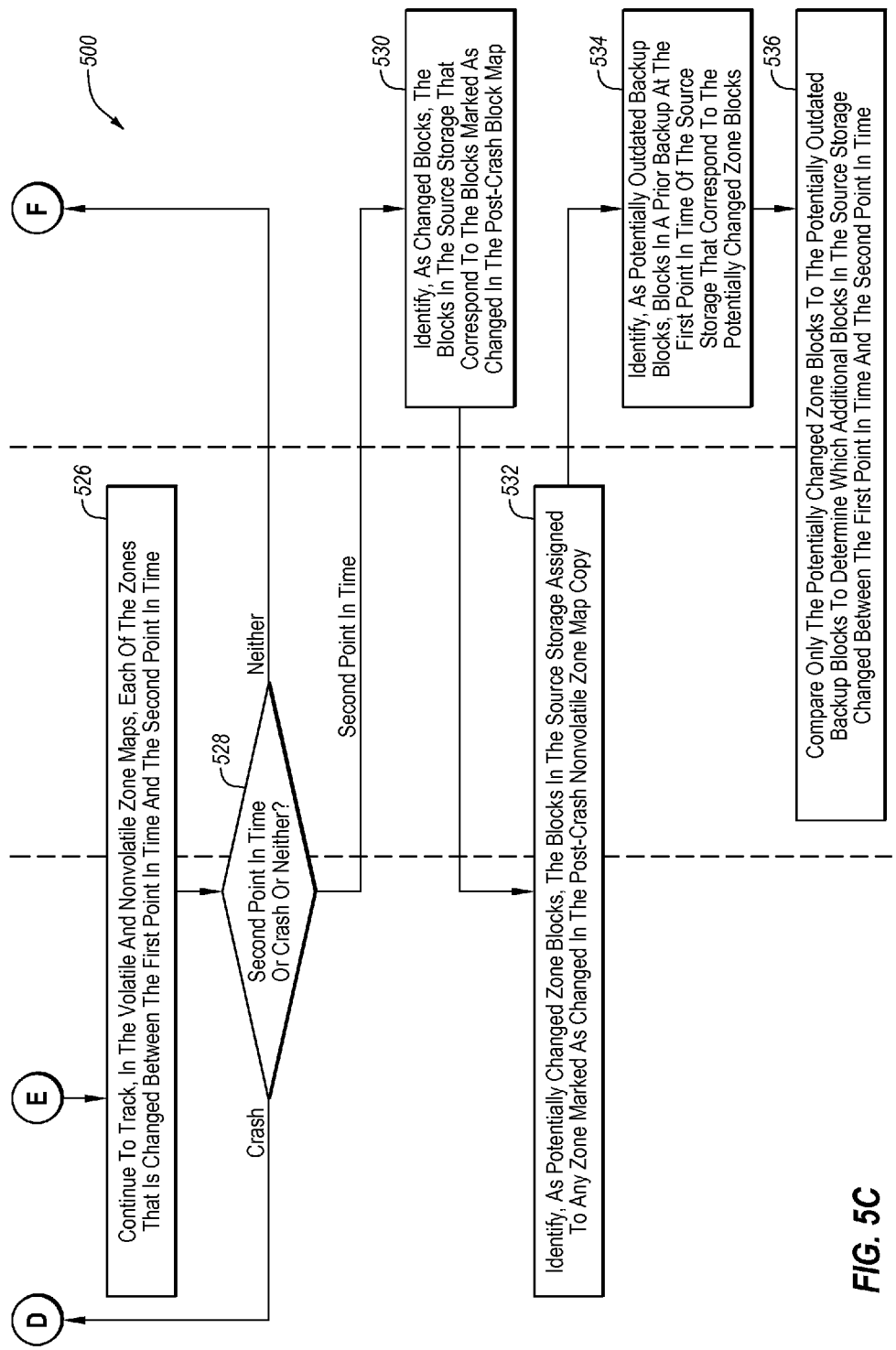

CRASH-TOLERANT INCREMENTAL CHANGE TRACKING BETWEEN BACKUPS OF A SOURCE STORAGE

FIELD

The embodiments disclosed herein relate to crash-tolerant incremental change tracking between backups of a source storage.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking.

A source storage may be initially backed up using an image backup operation to create a base backup and then in successive image backup operations, incremental backups of the source storage may be created. A new incremental backup may include only those blocks of the source storage that were changed subsequent to the creation of the most recent backup but prior to the creation of the new incremental backup. In order to easily back up only changed blocks during the creation of an incremental backup, it can be useful to incrementally track which blocks are changed between image backup operations instead of determining which blocks are changed by performing a full compare of every block in the source storage with corresponding blocks in base and incremental backups that were previously created.

One common problem that is encountered during successive image backup operations is the difficulty of reliably tracking incremental changes prior to the creation of each incremental backup. For example, incremental changes are typically tracked in volatile memory in order to avoid the performance degradation that would be caused by continually writing incremental changes to a nonvolatile storage. When a source system is gracefully shut down, the incremental changes tracking in volatile memory can be written once to a nonvolatile storage, and then read once from the nonvolatile storage and back into the volatile memory upon a graceful reboot. However, if the source system experiences an ungraceful loss of power or other crash, the incremental changes tracked in volatile memory are lost, and the only way to determine which blocks changed is to perform a full compare of every block in the source storage with corresponding blocks in base and incremental backups that were previously created. This full compare is time-intensive and resource-intensive.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to crash-tolerant incremental change tracking between backups of a source storage. The incremental change tracking methods disclosed herein divide the relatively high number of blocks in the source storage into a relatively low number of zones. The incremental change tracking methods disclosed herein then track changes to each zone in a corresponding nonvolatile zone map that is stored in nonvolatile storage and prior to the execution of any actual change to the blocks of the zone in the source storage. Thus, the incremental change tracking methods disclosed herein may reliably guarantee that the zones marked as changed in the nonvolatile zone map are the only zones that can possibly include changed blocks. While there exists the possibility that the nonvolatile zone map may be over-inclusive in the event of a crash (i.e., a zone may be marked as changed even where none of the blocks of the zone are actually changed in the source storage), the incremental change tracking methods disclosed herein are guaranteed to never be under-inclusive (i.e., it is guaranteed that every block of any unchanged zone will actually be unchanged in the source storage). Thus, in the event of a crash, the incremental change tracking methods disclosed herein can avoid the time-intensive and resource-intensive full compare of every block in the source storage with corresponding blocks in base and incremental backups that were previously created.

In one example embodiment, a method of crash-tolerant incremental change tracking between backups of a source storage includes assigning each block in a source storage into one of multiple zones, with each of the zones including multiple of the blocks, creating, in a nonvolatile storage, a nonvolatile zone map that represents each of the zones, and tracking, in the nonvolatile zone map, each of the zones that is changed between a first point in time and a second point in time. Each of the zones is marked as changed in the nonvolatile zone map upon the first receipt of a request to write to any of the blocks of the zone and prior to execution of the write request.

In another example embodiment, a method of crash-tolerant incremental change tracking between backups of a source storage includes creating, in a volatile memory, a volatile block map that represents each block in a source storage, assigning each of the blocks in the source storage into one of multiple zones, with each of the zones including multiple of the blocks, creating, in the source storage, a nonvolatile zone map that represents each of the zones, tracking, in the volatile block map, each of the blocks that is changed between a first point in time and a second point in time, and tracking, in the nonvolatile zone map, each of the zones that is changed between the first point in time and the second point in time. Each of the zones is marked as changed in the nonvolatile zone map upon the first receipt of a request to write to any of the blocks of the zone and prior to the execution of the write request.

In yet another example embodiment, a method of crash-tolerant incremental change tracking between backups of a source storage includes creating, in a volatile memory, a volatile block map that represents each block in a source storage, assigning each of the blocks in the source storage into one of multiple zones, each of the zones including multiple of the blocks, creating, in the source storage, a nonvolatile zone map that represents each of the zones, creating, in the volatile memory, a volatile zone map that represents each of the zones, tracking, in the volatile block map, each of the blocks that is changed between a first point in time and a second point in time, and tracking, in the volatile and nonvolatile zone maps, each of the zones that is changed between the first point in time and the second point in time. Each of the zones is marked as changed in the volatile and nonvolatile zone maps upon the first receipt of a request to write to any of the blocks of the zone and prior to the execution of the write request.

It is to be understood that both the foregoing general description and the following detailed description are exemplary and explanatory and are not restrictive of the invention as claimed.

BRIEF DESCRIPTION OF THE DRAWINGS

Example embodiments will be described and explained with additional specificity and detail through the use of the accompanying drawings in which:

FIGS. 5A-5C are schematic flowchart diagrams of another example method of crash-tolerant incremental change tracking between backups of a source storage; and.

DESCRIPTION OF EMBODIMENTS

Some embodiments described herein include crash-tolerant incremental change tracking between backups of a source storage. The incremental change tracking methods disclosed herein divide the relatively high number of blocks in the source storage into a relatively low number of zones. The incremental change tracking methods disclosed herein then track changes to each zone in a corresponding nonvolatile zone map that is stored in nonvolatile storage and prior to the execution of any actual change to the blocks of the zone in the source storage. Thus, the incremental change tracking methods disclosed herein may reliably guarantee that the zones marked as changed in the nonvolatile zone map are the only zones that can possibly include changed blocks. While there exists the possibility that the nonvolatile zone map may be over-inclusive in the event of a crash (i.e., a zone may be marked as changed even where none of the blocks of the zone are actually changed in the source storage), the incremental change tracking methods disclosed herein are guaranteed to never be under-inclusive (i.e., it is guaranteed that every block of any unchanged zone will actually be unchanged in the source storage). Thus, in the event of a crash, the incremental change tracking methods disclosed herein can avoid the time-intensive and resource-intensive full compare of every block in the source storage with corresponding blocks in base and incremental backups that were previously created.

The term "storage" as used herein refers to computer-readable media, or some logical portion thereof such as a volume, capable of storing data in blocks. The term "block" as used herein refers to a fixed-length discrete sequence of bits. The term "backup" when used herein as a noun refers to a copy or copies of one or more blocks from a storage.

Figure 1:
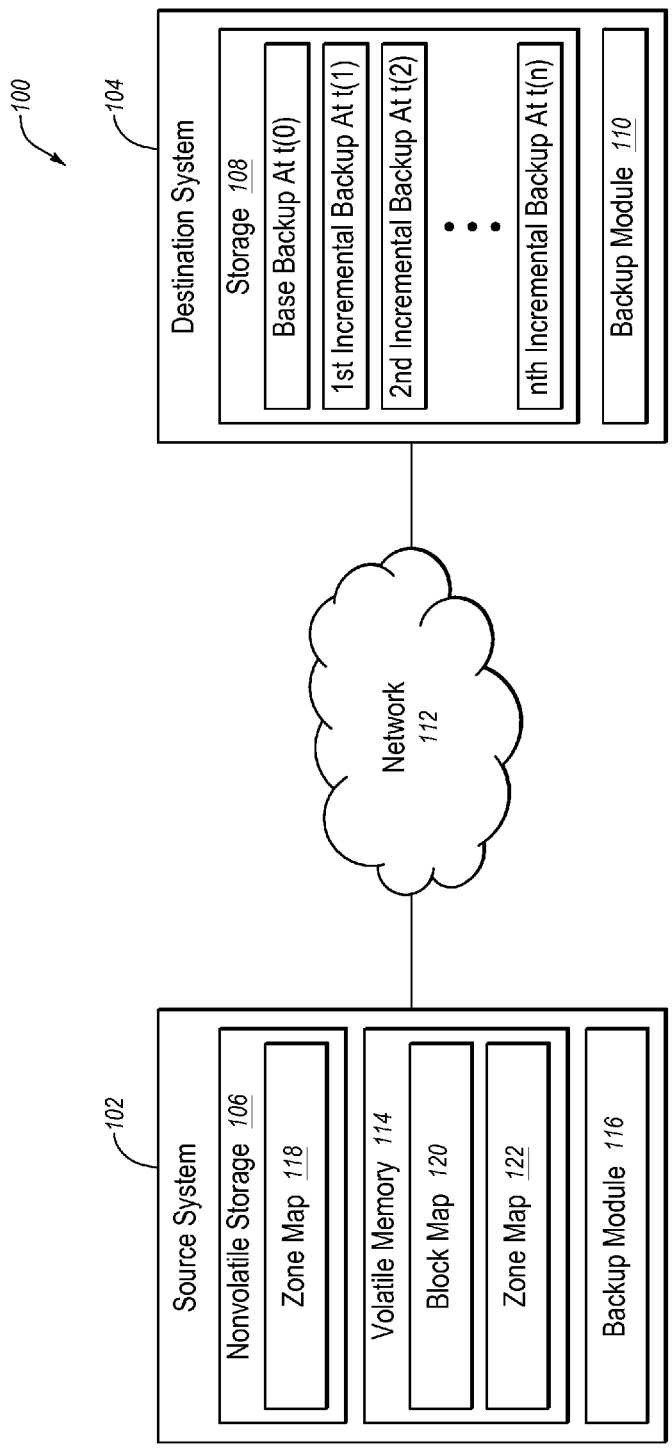
FIG. 1 is a schematic block diagram illustrating an example image backup system.

FIG. 1 is a schematic block diagram illustrating an example backup system 100. As disclosed in FIG. 1, the example backup system 100 includes a source system 102 and a destination system 104. The systems 102 and 104 include storages 106 and 108, respectively. The destination storage 108 stores a base backup and multiple incremental backups that have been created of the source storage 106 at various points in time. For example, the base backup was created at time t(0), the 1st incremental backup was created at time t(1), the 2nd incremental backup was created at time t(2), and the nth incremental backup was created at time t(n). The destination system 104 also includes a backup module 110. The systems 102 and 104 are able to communicate with one another over a network 112. The source system 102 also includes a volatile memory 114 and a backup module 116. The nonvolatile source storage 106 stores a nonvolatile zone map 118, and the volatile memory 114 stores a volatile block map 120 and a volatile zone map 122.

Each of the systems 102 and 104 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash memory drives, and virtual machines. The network 112 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

The image backup files stored in the destination storage 108 may be created by the backup module 110 and/or the backup module 116. For example, the backup module 110 and/or the backup module 116 may be configured to execute computer instructions to perform image backup operations of creating a base backup and multiple incremental backups of the source storage 106. It is noted that these image backups may initially be created on the source system 102 and then copied to the destination system 104.

For example, the base backup may be created to capture the state at time t(0). This image backup operation may include the backup module 110 copying all allocated blocks of the source storage 106 as allocated at time t(0) and storing the allocated blocks in the destination storage 108. The state of the source storage 106 at time t(0) may be captured using snapshot technology in order to capture the data stored in the source storage 106 at time t(0) without interrupting other processes, thus avoiding downtime of the source storage 106. The base backup may be very large depending on the size of the source storage 106 and the number of allocated blocks at time t(0). As a result, the base backup may take a relatively long time to create and consume a relatively large amount of space in the destination storage 108.

Next, the 1st and 2nd incremental backups may be created to capture the states at times t(1) and t(2), respectively. This may include copying only changed allocated blocks of the source storage 106 present at time t(1) and storing the changed allocated blocks in the destination storage 108, then later copying only changed allocated blocks of the source storage 106 present at time t(2) and storing the changed allocated blocks in the destination storage 108. The states of the source storage 106 at times t(1) and t(2) may again be captured using snapshot technology, thus avoiding downtime of the source storage 106. Each incremental backup may include only those allocated blocks from the source storage 106 that were changed after the time of the previous backup. Thus, the 1st incremental backup may include only those allocated blocks from the source storage 106 that changed between time t(0) and time t(1), and the 2nd incremental backup may include only those allocated blocks from the source storage 106 that changed between time t(1) and time t(2). In general, as compared to the base backup, each incremental backup may take a relatively short time to create and consume a relatively small storage space in the destination storage 108.

Finally, an nth incremental backup may be created to capture the state at time t(n). This may include copying only changed allocated blocks of the source storage 106 present at time t(n), using snapshot technology, and storing the changed allocated blocks in the destination storage 108. The nth incremental backup may include only those allocated blocks from the source storage 106 that changed between time t(n) and time t(n−1).

Therefore, incremental backups may be created on an ongoing basis. The frequency of creating new incremental backups may be altered as desired in order to adjust the amount of data that will be lost should the source storage 106 experience corruption of its stored data or become unavailable at any given point in time. The data from the source storage 106 can be restored to the state at the point in time of a particular incremental backup by applying the image backup files to a restore storage from oldest to newest, namely, first applying the base backup and then applying each successive incremental backup up to the particular incremental backup. The restore storage may be the source storage 106 or some other storage.

Although only allocated blocks are included in the example incremental backups discussed above, it is understood that in alternative implementations both allocated and unallocated blocks may be backed up during the creation of a base backup or an incremental backup. This is typically done for forensic purposes, because the contents of unallocated blocks can be interesting where the unallocated blocks contain data from a previous point in time when the blocks were in use and allocated. Therefore, the creation of base backups and incremental backups as disclosed herein is not limited to allocated blocks but may also include unallocated blocks. Further, although only base backups and incremental backup files are discussed above, it is understood that the source storage 106 may instead be backed up by creating a base backup and one or more decremental image backup files. Therefore, the crash-tolerant incremental change tracking between backups of a source storage as disclosed herein is not limited to tracking changes between base and incremental backups, but may also include tracking changes between base and decremental backups.

During performance of the example methods disclosed herein, the backup module 116 may track incremental changes to the source storage 106 between backups of the source storage 106. For example, the backup module 116 may track incremental changes to the source storage 106 between the time t(1) of the creation of the 1st incremental backup and the time t(2) of the creation of the 2nd incremental backup. In addition to tracking these changes in the nonvolatile zone map 118, the backup module 116 may also optionally track these changes at the same level of granularity in the volatile zone map 122 and/or at a more granular level in the volatile block map 120. However, even using the nonvolatile zone map 118 alone, the example methods disclosed herein can reliably guarantee that the zones marked as changed in the nonvolatile zone map 118 are the only zones of the source storage 106 that can possibly include changed blocks, even in the event of a crash of the source system 102. As discussed in greater detail below, even in the event of a crash of the source system 102, the incremental change tracking methods disclosed herein can avoid the time-intensive and resource-intensive full compare of every block in the source storage 106 with corresponding blocks in the base and incremental backups that were previously created and stored in the destination storage 108.

In one example embodiment, the source system 102 may be a desktop computer, the destination system 104 may be a file server, and the network 112 may include the internet. In this example embodiment, the file server may be configured to periodically back up the storage of the desktop computer over the internet as part of a backup job by creating the base backup and the multiple incremental backups stored in the destination storage 108. The desktop computer may also be configured to track incremental changes to its storage between backups in order to easily and quickly identify only those blocks that changed during the creation of an incremental backup. The file server may also be configured to restore one or more of the image backup files to the storage of the desktop computer over the internet if the desktop computer experiences corruption or a user simply desires to restore the storage of the desktop computer to an earlier point in time.

Although only a single storage is disclosed in each of the systems 102 and 104 in FIG. 1, it is understood that any of the systems 102 and 104 may instead include two or more storages. Further, although the systems 102 and 104 are disclosed in FIG. 1 as communicating over the network 112, it is understood that the systems 102 and 104 may instead communicate directly with each other. For example, in some embodiments the systems 102 and 104 may be combined into a single system. Also, although the storages 106 and 108 are disclosed as separate storages, it is understood that the storages 106 and 108 may be combined into a single storage. For example, in some embodiments a first volume of the source storage 106 may function as a source storage during the creation of a backup that is stored in a second volume of the source storage 106. Subsequently, the backup stored in the second volume may be restored to the first volume, which may enable the first volume of the source storage 106 to be restored to a state of an earlier point in time. In another example, the source system 102 may have a separate storage (not shown) to which a backup of the source storage 106 is restored. In both of these examples, the source system 102 functions as both a source system and a destination system. Further, although the backup modules 110 and 116 are the only modules disclosed in the example backup system 100 of FIG. 1, it is understood that the functionality of the backup modules 110 and 116 may be replaced or augmented by one or more similar modules residing on either of the systems 102 and 104 or another system.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

FIGS. 2A-2F are schematic flowcharts illustrating the tracking of changes to zones of a source storage in a zone map. For example, FIGS. 2A-2F disclose the source storage 106, the volatile block map 120, and the nonvolatile and volatile zone maps 118 and 122 between the time t(1) of the creation of the 1st incremental backup and the time t(2) of the creation of the 2nd incremental backup (see FIG. 1).

Figure 2A:
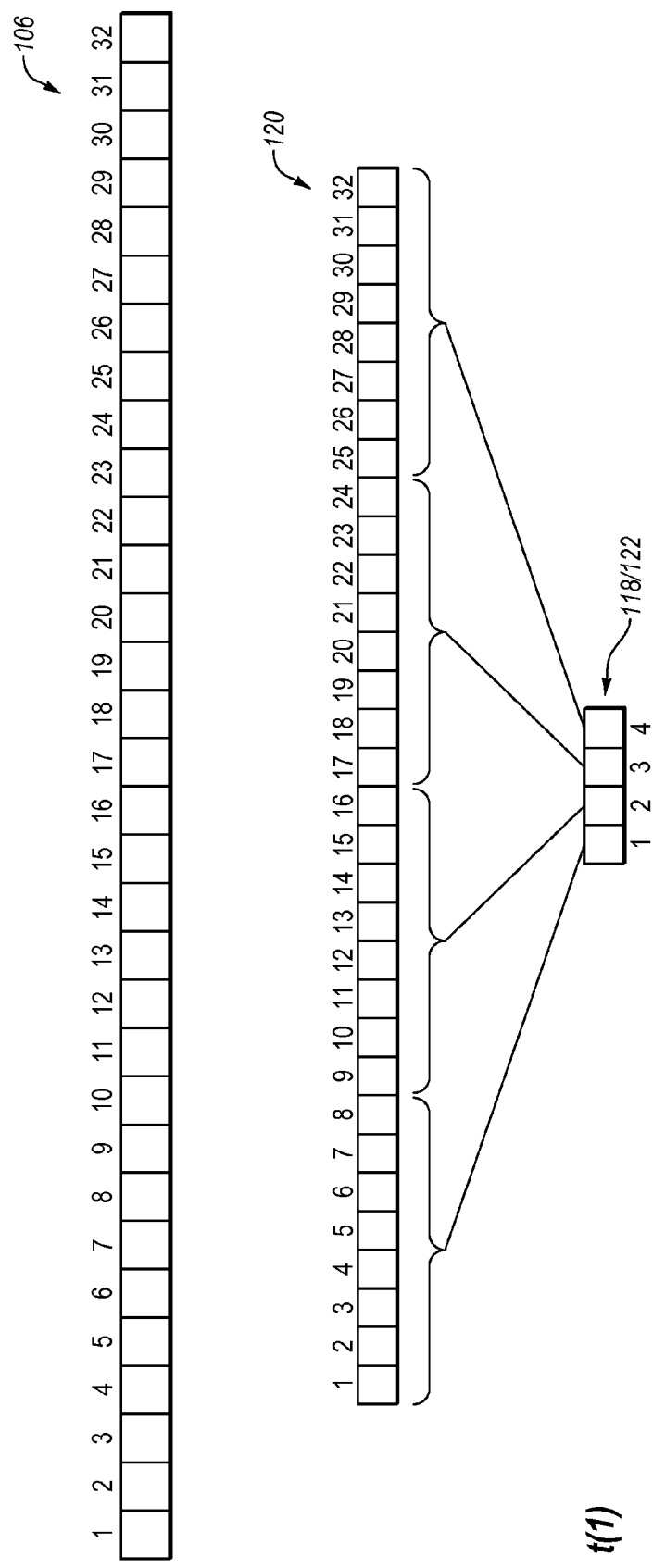
FIGS. 2A-2F are schematic flowcharts illustrating the tracking of changes to zones of a source storage in a zone map.

As disclosed in FIG. 2A, the source storage 106 is partitioned into a physical layout of blocks (1)-(32). In some example embodiments, the size of each block is 512 bytes, although any other block size could instead be employed. The size of each block may be configured to match the standard sector size of a file system of the source storage 106. It is understood that the source storage 106 may have less than 32 blocks or more than 32 blocks. For example, the source storage 106 may include millions of blocks, billions of blocks, trillions of blocks, or even more blocks. In one example, the source storage 106 may be a one-terabyte storage, with 2,147,483,648 blocks each having 512 bytes. The disclosure of 32 blocks in FIGS. 2A-2F is, therefore, for illustration purposes only.

As disclosed in FIG. 2A, the volatile block map 120 is capable of recording whether each of the blocks 1-32 of the source storage 106 has been changed between the time t(1) and the time t(2). The volatile block map 120 may be implemented, for example, using a bitmap where each bit corresponds to a block in the source storage 106, with the bit being set to "1" to represent a changed block and the bit being set to "0" to represent an unchanged block, or vice versa. Alternatively, the volatile block map 120 may be implemented, for example, as a run-length encoded list of bits including a bit corresponding to each of the blocks in the source storage 106.

Further, FIG. 2A discloses that the relatively high number of 32 blocks of the source storage 106 has been divided into a relatively low number of four zones (1-4) with eight blocks assigned to each zone. For example, blocks (1-8) are represented by zone (1), blocks (9-16) are represented by zone (2), blocks (17-24) are represented by zone (3), and blocks (25-32) are represented by zone (4). Therefore, each block in the source storage 106 has been assigned into one of the zones (1-4), with each of the zones (1-4) including multiple blocks. It is understood that each zone may represent less than eight blocks or more than eight blocks. For example, each zone in the nonvolatile and volatile zone maps 118 and 122 may represent many hundreds of blocks, thousands of blocks, or even more blocks. In the example above where the source storage 106 is one terabyte, each zone may represent one megabyte of blocks, which equals 2048 blocks where each block has 512 bytes, resulting in 1,048,576 zones in each of the nonvolatile and volatile zone maps 118 and 122. The disclosure of each zone representing eight blocks in FIGS. 2A-2F is, therefore, for illustration purposes only. As with the volatile block map 120, the nonvolatile and volatile zone maps 118 and 122 may each be implemented, for example, using a bitmap including a bit corresponding to each of the zones of the source storage 106 or a run-length encoded list of bits including a bit corresponding to each of the zones of the source storage 106.

Each block in the source storage 106 of FIGS. 2B-2F having a pattern represents a block that was changed between the time t(1) and the time t(2), for example, due to a write request that resulted in the data in the block being overwritten. The identical patterns in the volatile block map 120 represent the tracking, in the volatile block map 120, of each of the blocks that is changed between time t(1) and the time t(2). Similarly, the identical patterns in the nonvolatile and volatile zone maps 118 and 122 represent the tracking, in the nonvolatile and volatile zone maps 118 and 122, of each of the blocks that is changed between time t(1) and the time t(2). It is noted that each of the zones (1-4) in the nonvolatile and volatile zone maps 118 and 122 is only marked as changed upon the first receipt of a request to write to any of the blocks of the zone and prior to the execution of the write request in the source storage 106.

Figure 2B:
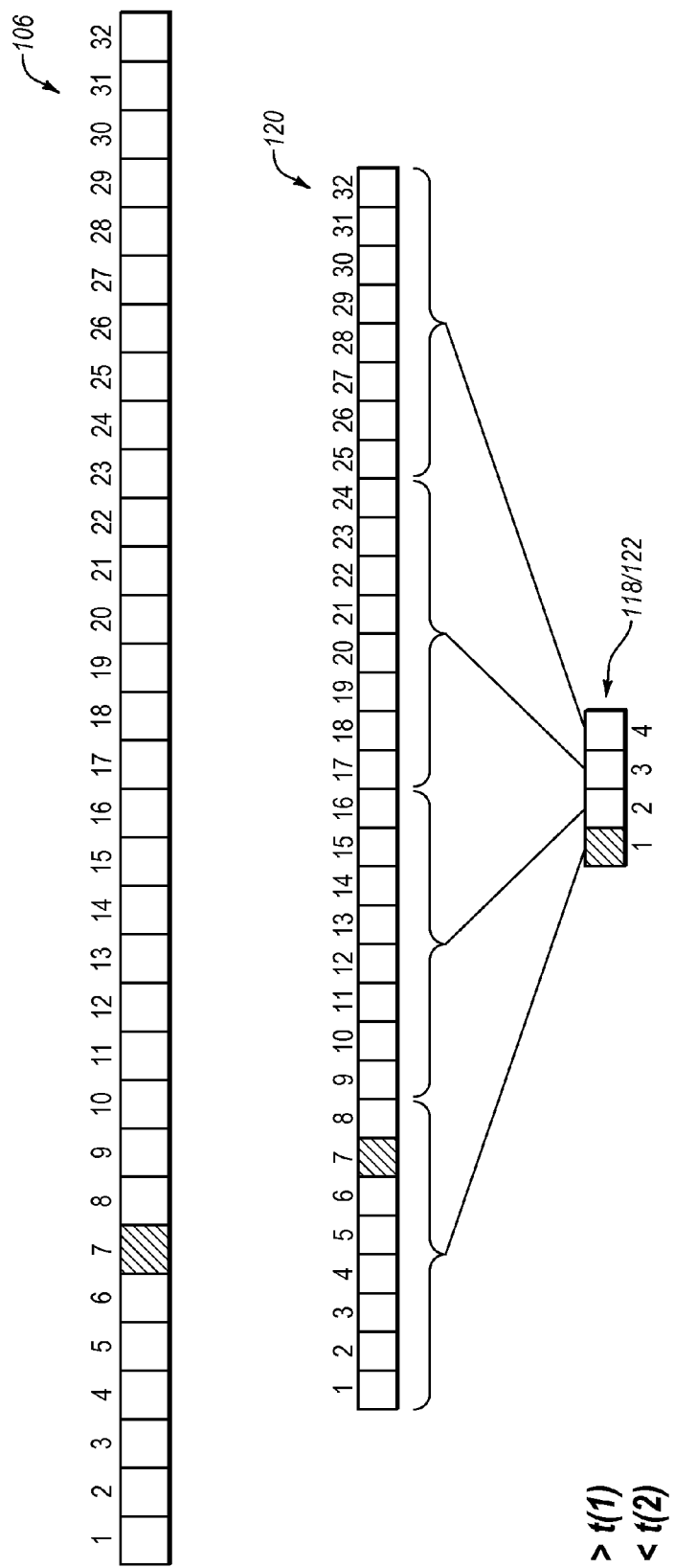
Figure 2C:
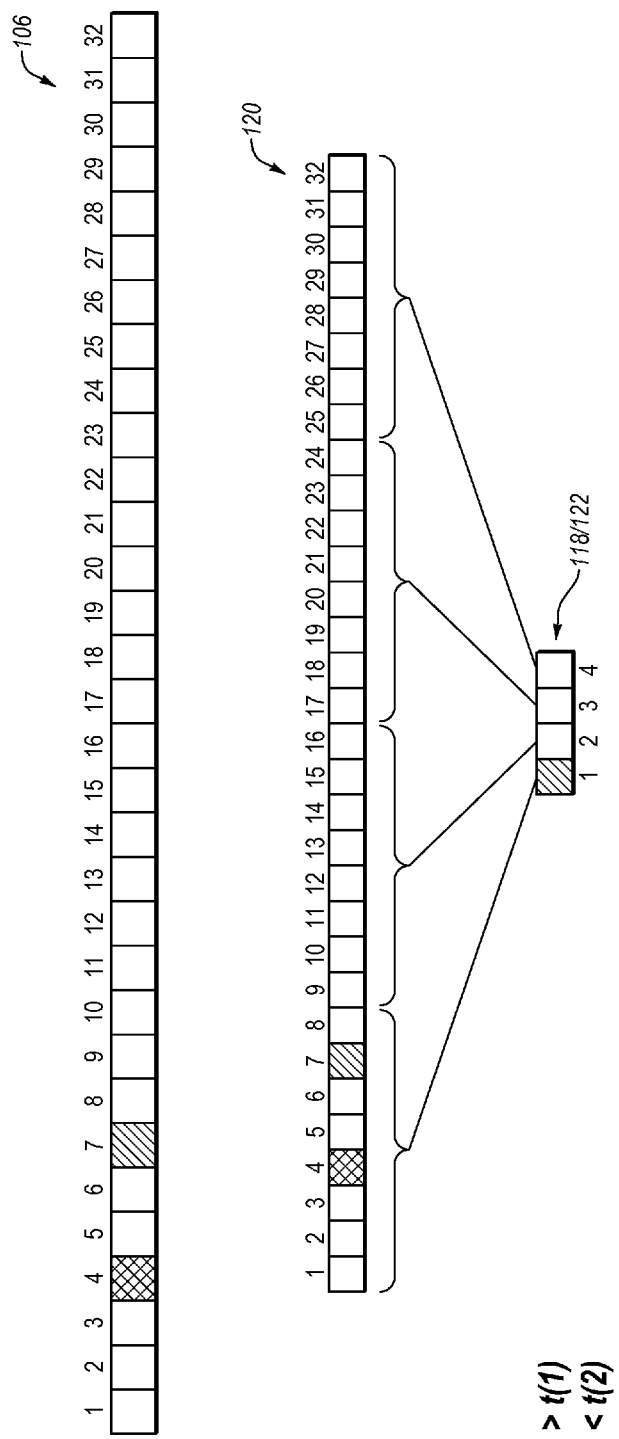
Figure 2D:
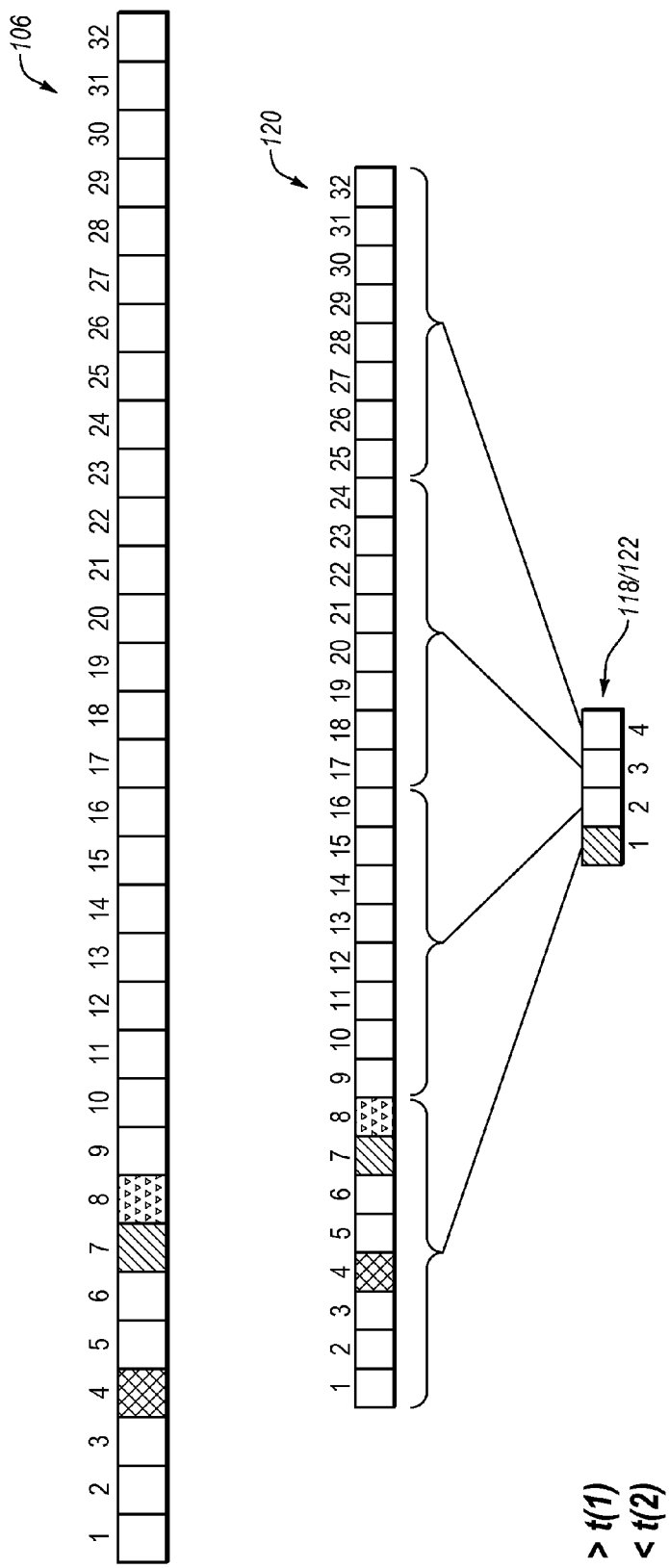
Figure 2E:
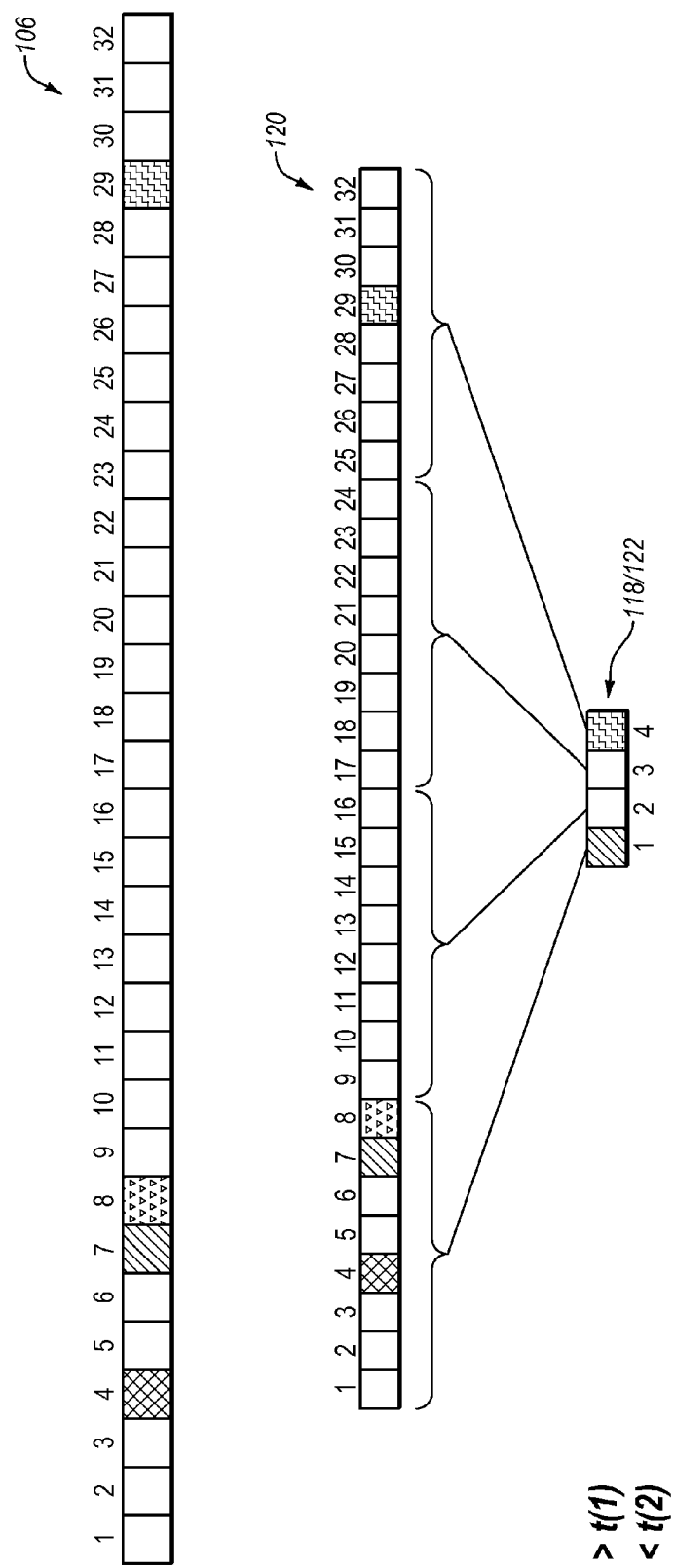
Figure 2F:
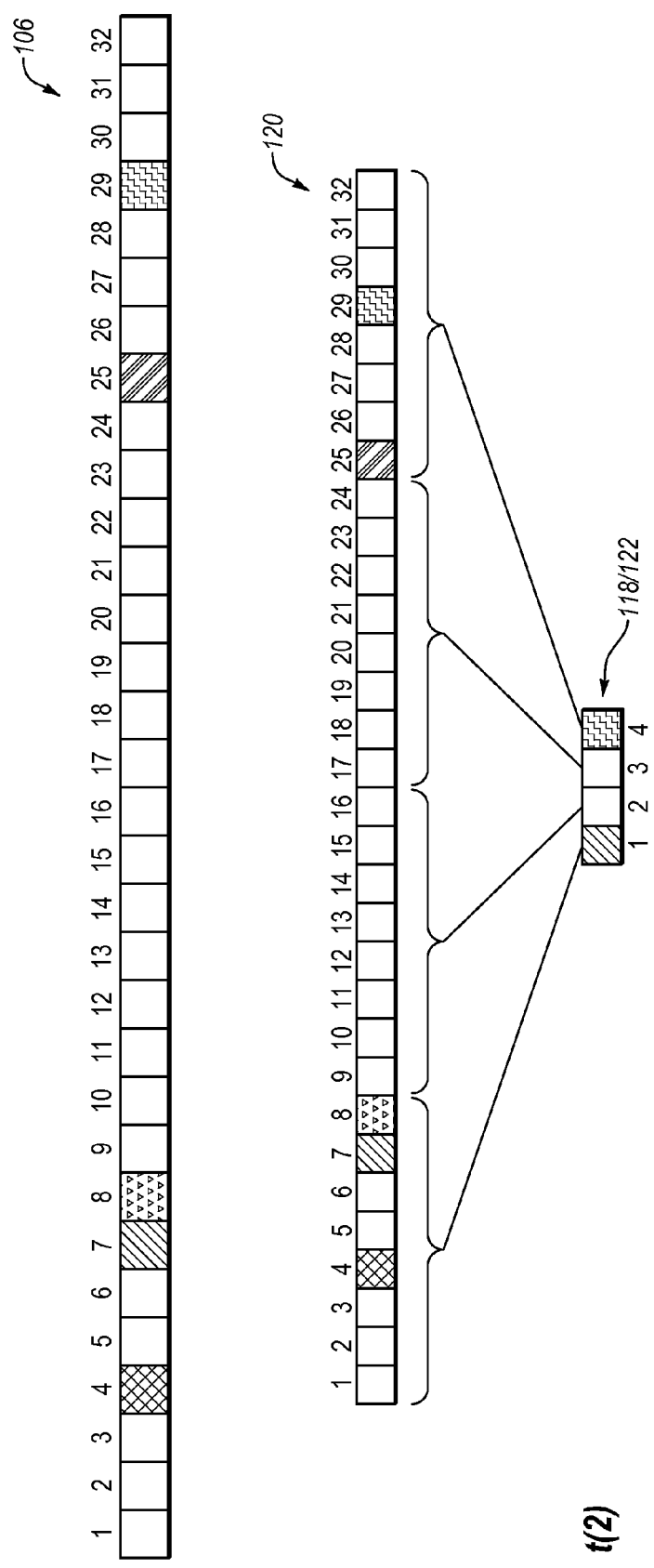
Figure 3:
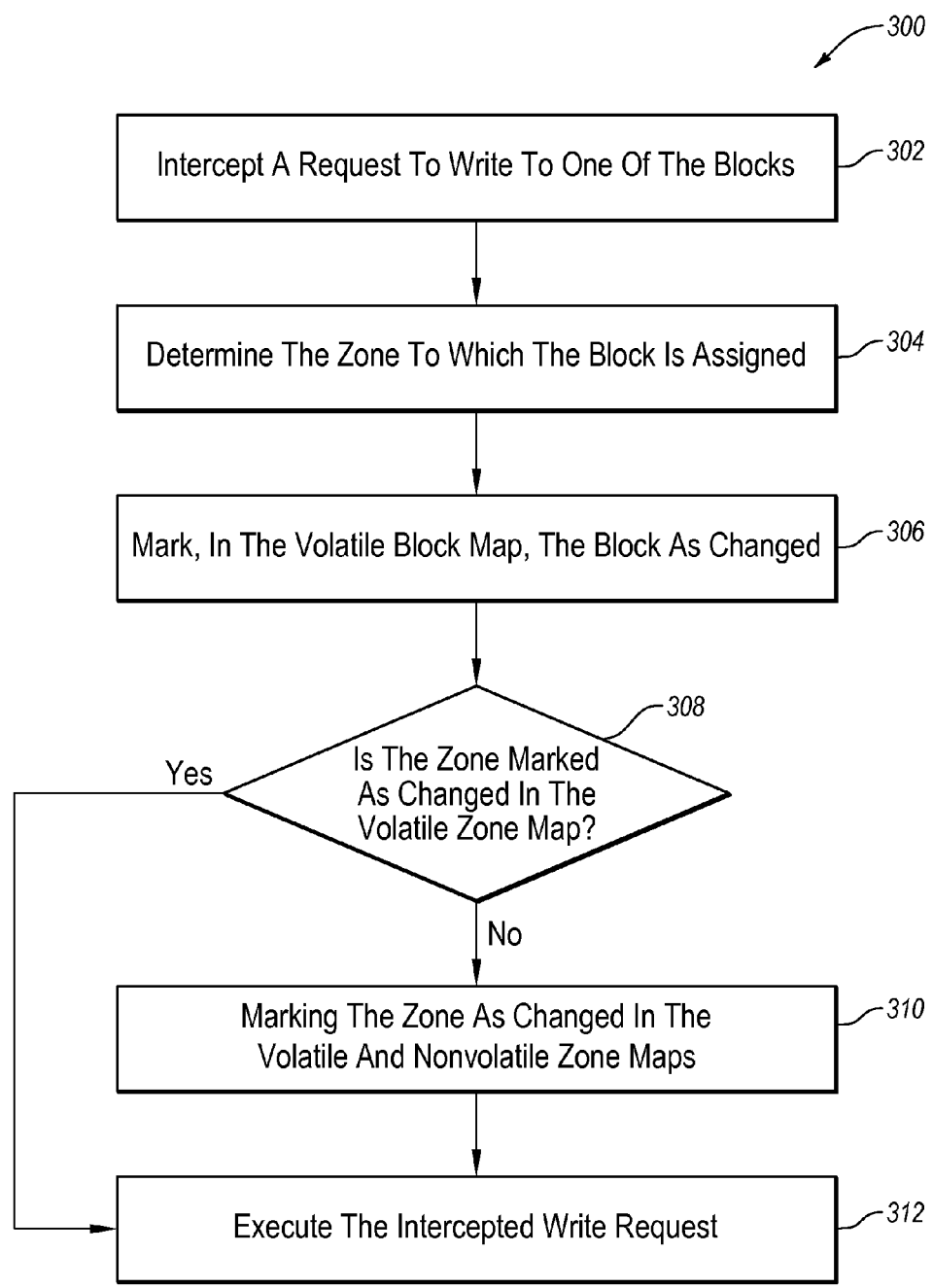
FIG. 3 is a schematic flowchart illustrating an example method for tracking changes to blocks and zones of a source storage.

FIG. 3 is a schematic flowchart illustrating an example method 300 for tracking changes to blocks and zones of the source storage. The method 300 may be implemented, in at least some embodiments, by the backup module 116 of the source system 102 of FIG. 1. For example, the backup module 116 may be configured to execute computer instructions to perform operations of tracking changes to blocks and zones of the source storage 106 in the volatile block map 120 and in the nonvolatile and volatile zone maps 118 and 122, as represented by one or more of steps 302-312 of the method 300. Prior to the method 300, various image backup operations of a backup job may have transpired, which will have resulted at least in the creation of a base backup in the destination storage 108 and may have also resulted in the creation of one or more incremental backups in the destination storage 108 (see FIG. 1). Also, prior to the method 300, the volatile block map 120 and the nonvolatile and volatile zone maps 118 and 122 may be reset at time t(1) to represent that no blocks of the source storage 106 have been changed, as disclosed in FIG. 2A. Although illustrated as discrete steps, various steps may be divided into additional steps, combined into fewer steps, reordered, or eliminated, depending on the desired implementation. The method 300 will now be discussed with reference to FIGS. 1, 2A-2F, and 3.

The method 300 may begin at step 302, in which a request to write to one of the blocks of the source storage may be intercepted. Then, at step 304, the zone to which the block is assigned is determined. Next, at step 306, the corresponding block in the volatile block map may be marked as changed. Then, at decision step 308, it is determined whether the zone is marked as changed in the nonvolatile and volatile zone maps 118 and 122. If it is determined at step 308 that the zone is not marked as changed in the nonvolatile and volatile zone maps 118 and 122 (No at step 308), then the method 300 proceeds to step 310 where the zone is marked as changed in the nonvolatile and volatile zone maps 118 and 122. Otherwise (Yes at step 308), the method 300 proceeds directly to step 312 where the intercepted write request is executed.

In the examples of the method 300 disclosed in FIGS. 2B and 2E, the backup module 116 of FIG. 1 may intercept, at step 302, a request to write to the block (7) or (29) of the source storage 106, then mark, at step 304, the corresponding block (7) or (29) in the volatile block map 120 as changed, and then determine, at step 306, that the block (7) or (29) of the source storage 106 is assigned to the zone (1) or (4) of the nonvolatile and volatile zone maps 118 and 122. Next, the backup module 116 may determine, at step 308, that the zone (1) or (4) of the nonvolatile and volatile zone maps 118 and 122 is not yet marked as changed (No at step 308), and accordingly mark, at step 310, the zone (1) or (4) as changed in the nonvolatile and volatile zone maps 118 and 122 and then allow, at step 312, the intercepted write request to be executed on block (7) or (29) of the source storage 106.

In the examples of the method 300 disclosed in FIGS. 2C, 2D, and 2F, the backup module 116 of FIG. 1 may intercept, at step 302, a request to write to the block (4), (8), or (25) of the source storage 106, then mark, at step 304, the corresponding block (4), (8), or (25) in the volatile block map 120 as changed, and then determine, at step 306, that the block (4), (8), or (25) of the source storage 106 is assigned to the zone (1) or (4) of the nonvolatile and volatile zone maps 118 and 122. Next, the backup module 116 may determine, at step 308, that the zone (1) or (4) of the nonvolatile and volatile zone maps 118 and 122 is already marked as changed (Yes at step 308), and accordingly proceed directly to allowing, at step 312, the intercepted write request to be executed on the block (4), (8), or (25) of the source storage 106.

The examples of the method 300 disclosed in FIGS. 2B-2F disclose five write requests resulting in five updates to the volatile block map 120 but only two updates to the nonvolatile and volatile zone maps 118 and 122. Since each update to the nonvolatile zone map 118 requires a write to the nonvolatile source storage 106, the tracking of relatively fewer zones instead of relatively many blocks in the nonvolatile source storage 106 results in fewer performance-degrading writes to the nonvolatile source storage 106.

Figure 4A:
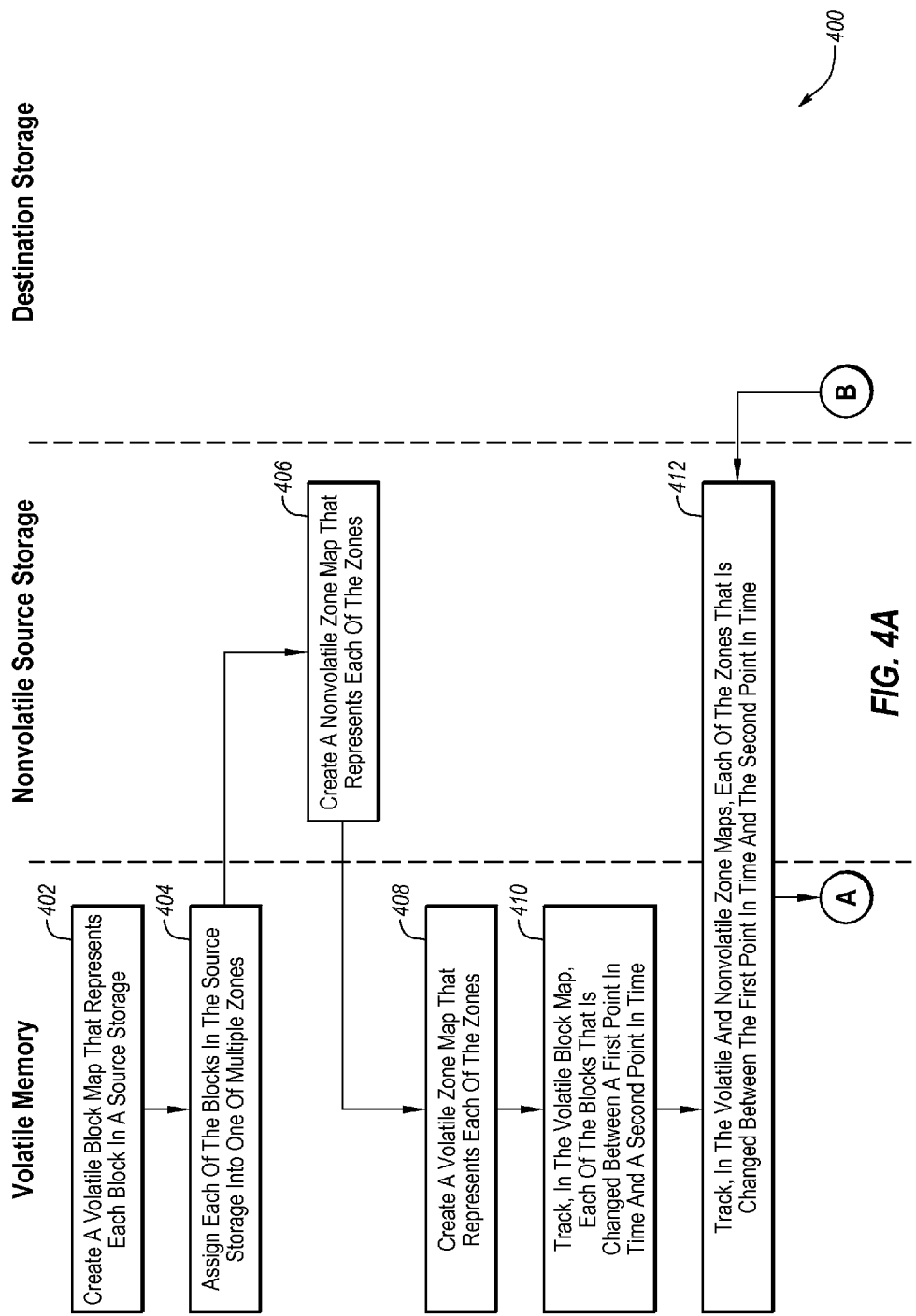
FIGS. 4A-4B are schematic flowchart diagrams of an example method of crash-tolerant incremental change tracking between backups of a source storage.
Figure 4B:
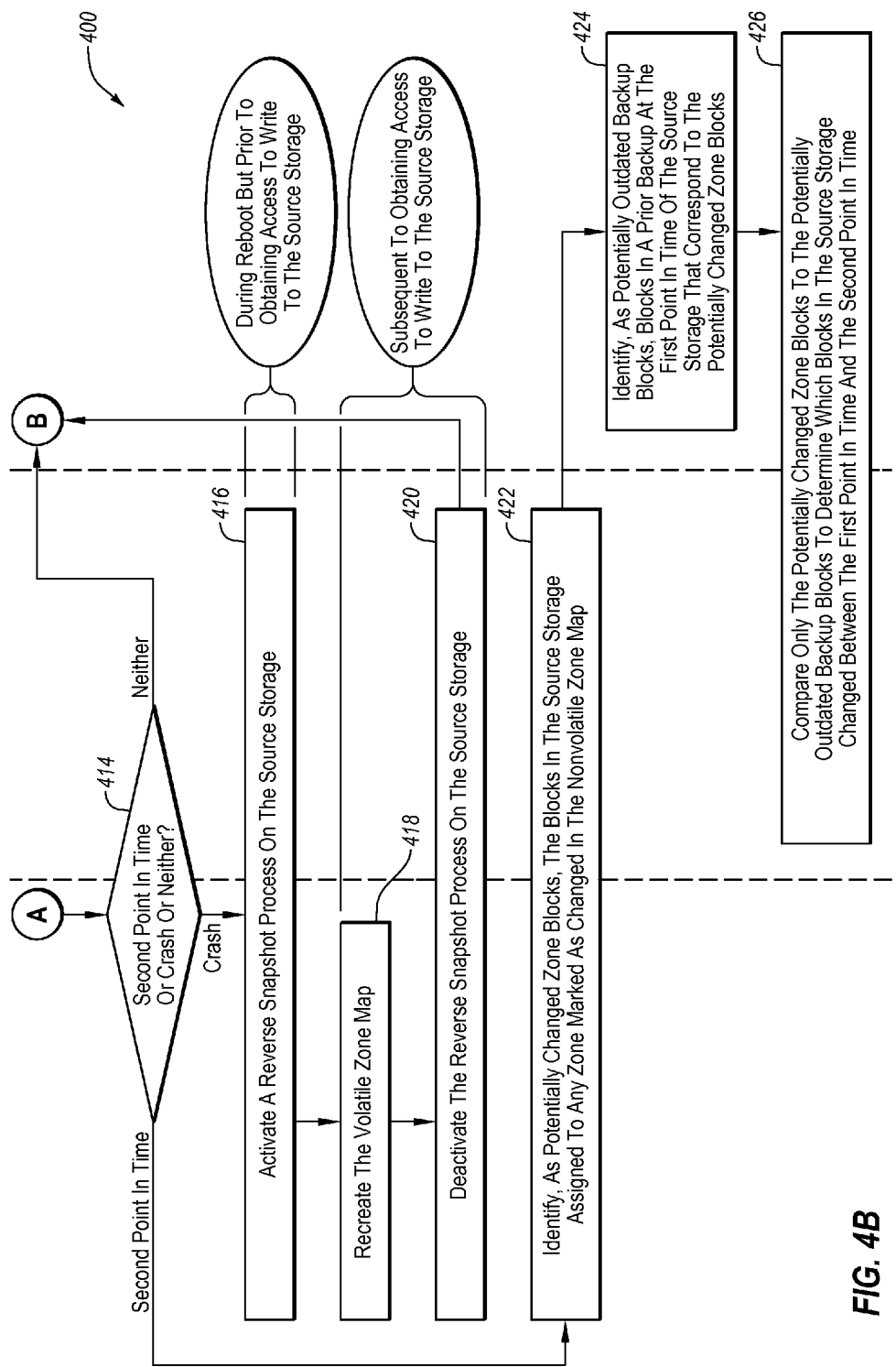

FIGS. 4A-4B are schematic flowchart diagrams of an example method 400 of crash-tolerant incremental change tracking between backups of a source storage. The method 400 may be implemented, in at least some embodiments, by the backup module 116 of the source system 102 of FIG. 1. For example, the backup module 116 may be configured to execute computer instructions to perform operations of crash-tolerant incremental change tracking between backups of the source storage 106, as represented by one or more of the steps 402-426 of the method 400. Prior to the method 400, various image backup operations of a backup job may have transpired, which will have resulted at least in the creation of a base backup in the destination storage 108 and may have also resulted in the creation of one or more incremental backups in the destination storage 108 (see FIG. 1). Also, prior to the method 400, the volatile block map 120 and the nonvolatile and volatile zone maps 118 and 122 may be reset at time t(1) to represent that no blocks of the source storage 106 have been changed. Although illustrated as discrete steps, various steps may be divided into additional steps, combined into fewer steps, reordered, or eliminated, depending on the desired implementation. The method 400 will now be discussed with reference to FIGS. 1 and 4A-4B.

The method 400 may begin at step 402, in which a volatile block map may be created, in volatile memory, that represents each block in a source storage. For example, the backup module 116 of FIG. 1 may create, at step 402, the volatile block map 120 in the volatile memory 114 which, as disclosed in FIGS. 2A-2F, represents each block in the source storage 106.

Next, at step 404, each of the blocks in the source storage may be assigned into one of multiple zones, with each of the zones including multiple of the blocks. Then, at step 406, a nonvolatile zone map that represents each of the zones may be created in the source storage and, at step 408, a volatile zone map that represents each of the zones may be created in the volatile memory. For example, the backup module 116 of FIG. 1 may assign, at step 404, each of the blocks of the source storage 106 of the source system 102 into one of multiple zones, then may create, at step 406, the nonvolatile zone map 118 in the nonvolatile source storage 106 of the source system 102, and then may create, at step 408, the volatile zone map 122 in the volatile memory 114 of the source system 102.

Once the volatile block map and the volatile and nonvolatile zone maps have been created in steps 402, 406, and 408, the method 400 may proceed to step 410 in which each of the blocks that is changed between a first point in time and a second point in time is tracked in the volatile block map. For example, the backup module 116 of FIG. 1 may track, at step 410, each of the blocks that is changed in the source storage 106 between the time t(1) and the time t(2), for example, as discussed above in connection with the method 300 of FIG. 3.

Next, at step 412, each of the zones that is changed between the first point in time and the second point in time is tracked in the volatile and nonvolatile zone maps. At the step 412, each of the zones is marked as changed in the volatile and nonvolatile zone maps upon the first receipt of a request to write to any of the blocks of the zone and prior to the execution of the write request. For example, the backup module 116 of FIG. 1 may track, at step 412, each of the zones that is changed in the source storage 106 between the time t(1) and the time t(2), for example, as discussed above in connection with the method 300 of FIG. 3. The step 412 may be performed by the backup module 116 of FIG. 1 prior to the execution of the first write request corresponding to each zone. By tracking each of the zones that is changed between the time t(1) and the time t(2) in the nonvolatile zone map 118, the method 400 can reliably guarantee that the zones marked as changed in the nonvolatile zone map 118 are the only zones that can possibly include changed blocks, even in the event of a crash of the source system 102. As discussed in greater detail below, even in the event of a crash of the source system 102, the method 400 can avoid the time-intensive and resource-intensive full compare of every block in the source storage 106 with corresponding blocks in the base and incremental backups that were previously created and stored in the destination storage 108.

Then, at decision step 414, it may be determined that the second point in time has arrived for creating the 2nd incremental backup of the source storage, that an operating system associated with the source storage has crashed, or that neither has occurred. If it is determined at step 414 that the second point in time has arrived for creating the 2nd incremental backup of the source storage (Second Point In Time at 414), then the method 400 may proceed to the step 422. If the second point in time has not arrived, and if it is determined at step 414 that an operating system associated with the source storage has crashed (Crash at 414), then the method 400 may proceed to the step 416. If it is determined at the step 414 that the second point in time has not arrived and that the operating system has not crashed (Neither at 414), then the method 400 may return to the step 412.

As noted above, at step 414, it may be determined that an operating system associated with the source storage has crashed. For example, an operating system associated with the source storage 106, such as an operating system of the source system 102, may experience an ungraceful loss of power or other crash. At the time of the crash, since the volatile block map 120 is stored in the volatile memory 114 of the source system 102, the volatile block map 120 and the volatile zone map 122 will be lost and cannot, therefore, be employed in determining which blocks in the source storage 106 changed between the time t(1) and the time t(2). However, since the nonvolatile zone map 118 is stored in the nonvolatile source storage 106, the nonvolatile zone map 118 will not be lost at the time of the crash, and can, therefore, continue to be employed in determining which blocks in the source storage 106 changed between the time t(1) and the time t(2).

After a crash at step 414, the method 400 next proceeds to the step 416 where the operating system is rebooted to continue tracking changes to the source storage. During the reboot but prior to obtaining access to write to the source storage, at step 416 a reverse snapshot process on the source storage may be activated. The reverse snapshot process may allow, during the mounting of the source storage, each request to write to one of the blocks of the source storage to be pooled in a location other than the location of the block without actually executing the write request and with the write request falsely being reported as successfully executed. The term "mounted" as used herein refers to a storage being in a state in which the standard file system of the operating system associated with the storage recognizes the storage as containing files and/or folders and exposes standard file-level and/or folder-level access mechanisms to enable operations to the files and/or folders such as, but not limited to, opening, reading, writing, closing, etc. The term "pooling a write request" as used herein refers to storing a write request in a location other than the location of the block to which the write request corresponds.

For example, during reboot of the operating system of the source system 102, the backup module 116 may not initially have access to write to the source storage 106 because the source storage 106 is not yet mounted, and therefore the backup module 116 of FIG. 1 may activate, at step 416, a reverse snapshot on the source storage 106. During the mounting of the source storage 106, the reverse snapshot may include the backup module 116 pooling the write requests, instead of allowing write requests to the source storage 106 to be written as requested, until such time as the backup module 116 obtains access to write to the source storage 106 once the source storage 106 is mounted. For example, the backup module 116 may pool a write request by storing the write request in the volatile memory 114 or by writing the write request to a location in the nonvolatile source storage 106 other than the requested location. Once each write request is pooled, the backup module 116 may then falsely report back to the requestor of the write request that the write request successfully executed. This pooling and false reporting of successful execution of a write request is distinct from simply queuing a write request, which may cause the reboot process to pause waiting for the write request to execute. The pooling of write requests by the backup module 116 may be performed in such a way that a read request for any block included in the pool can also be intercepted and the corresponding pooled data can be returned instead of the actual data at the block, which due to the pooling has become invalid. This pooling of write requests may ensure that no changes occur to the source storage 106 prior to the volatile zone map 122 being recreated using the content of the nonvolatile zone map 118.

Next, subsequent to obtaining access to write to the source storage, at step 418, the volatile zone map may be recreated in volatile memory and, at 420, the reverse snapshot process on the source storage may be deactivated. Deactivating the reverse snapshot process on the source storage may include marking the zone of each pooled write request as changed, in the volatile and nonvolatile zone maps, if the zone is not marked as changed in the volatile zone map and subsequently executing the pooled write request in the source storage.

For example, once the backup module 116 of FIG. 1 finally obtains access to write to the source storage 106 due to the source storage 106 being mounted, either during or after the completion of the reboot of the source system 102, the backup module 116 of FIG. 1 may recreate, at step 418, the volatile zone map 122 in the volatile memory 114, by reading the nonvolatile zone map 118 into the volatile memory 114. In this example, the conclusion of the mount operation on the source storage 106 enables the volatile zone map 122 to be recreated in the volatile memory 114 by simply reading the nonvolatile zone map 118 using standard file system calls of the standard file system of the operating system associated with the source storage 106. The use of standard file system calls to recreate the volatile zone map 122 is much simpler than enabling the backup module 116 to read the nonvolatile zone map 118 without the help of the standard file system. Then the backup module 116 of FIG. 1 may deactivate, at step 420, the reverse snapshot on the source storage 106. The deactivating of the reverse snapshot may include marking the zone of each pooled write request as changed, in the nonvolatile and volatile zone maps 118 and 122, if the zone is not already marked as changed in the volatile zone map 122 (since checking the volatile zone map 122 is faster than checking the nonvolatile zone map 118) and subsequently executing the pooled write request in the source storage 106. Once each of the pooled write requests has been executed in the source storage 106, the deactivation of the reverse snapshot may be completed by the backup module 116 ceasing to pool write requests.

If the second point in time has arrived at step 414 to create the 2nd incremental backup, the method 400 proceeds directly to the steps 422-426 where the nonvolatile zone map 118 may be employed to determine which blocks in the source storage 106 changed between the first point in time and the second point in time.

In particular, at step 422, the blocks in the source storage assigned to any zone marked as changed in the nonvolatile zone map are identified as potentially changed zone blocks. For example, the backup module 116 may identify, at step 422, the blocks in the source storage 106 that are assigned to any zone marked as changed in the nonvolatile zone map 118 as potentially changed zone blocks.

Next, at step 424, the most recently backed-up blocks in one or more prior backups of the source storage that correspond to the potentially changed zone blocks are identified as potentially outdated backup blocks, where the one or more prior backups represent the source storage at the first point in time. For example, the backup module 116 may identify, at step 424, the most recently backed-up blocks that correspond to the potentially changed zone blocks in the base backup and the 1st incremental backup stored in the destination storage 108 as potentially outdated backup blocks.

Finally, at step 426, only the potentially changed zone blocks are compared to the potentially outdated backup blocks to determine which blocks in the source storage changed between the first point in time and the second point in time. For example, the backup module 116 may compare, at step 426, only the potentially changed zone blocks to the potentially outdated backup blocks to determine which blocks in the source storage 106 actually changed between the time t(1) and the time t(2).

Continuing with the example, by the conclusion of step 426, all blocks in the source storage 106 that were changed between the time t(1) and the time t(2) will have been identified. Even where there has been a crash of the source system 102, these changed blocks will have been reliably identified without performing the time-intensive and resource-intensive full compare of every block in the source storage 106 with corresponding blocks in the base and incremental backups that were previously stored in the destination storage 108.

It is understood that the foregoing discussion of the method 400 is but one possible implementation of a method of crash-tolerant incremental change tracking between backups of a source storage, and various modifications are possible and contemplated. For example, the method may be modified to remove the steps or portions of steps that involve the volatile zone map. Alternatively or additionally, the method may be modified to remove the steps or portions of steps that involve the volatile block map. Thus, in some example embodiments, the nonvolatile zone map may be exclusively employed, employed with the volatile zone map, or employed with the volatile block map to accomplish the methods disclosed herein. Employing the nonvolatile zone map together with the volatile block map may be desirable in some embodiments because it allows for the best-case possibility that no crash will occur, and thus leave open the possibility of using the more granular volatile block map to quickly determine which blocks were changed between a first point in time and a second point in time. These embodiments also allow for an intermediate solution (between simply reading from a volatile block map and a performing a full compare) of using the nonvolatile zone map in the event of a crash. Further, the step 410 may be performed after the step 412 for each request to write to a block of the source storage, since each write request may not actually be executed until after the write request is tracked, if necessary, in the nonvolatile zone map (and optionally also in the volatile zone map).

Figure 5A:
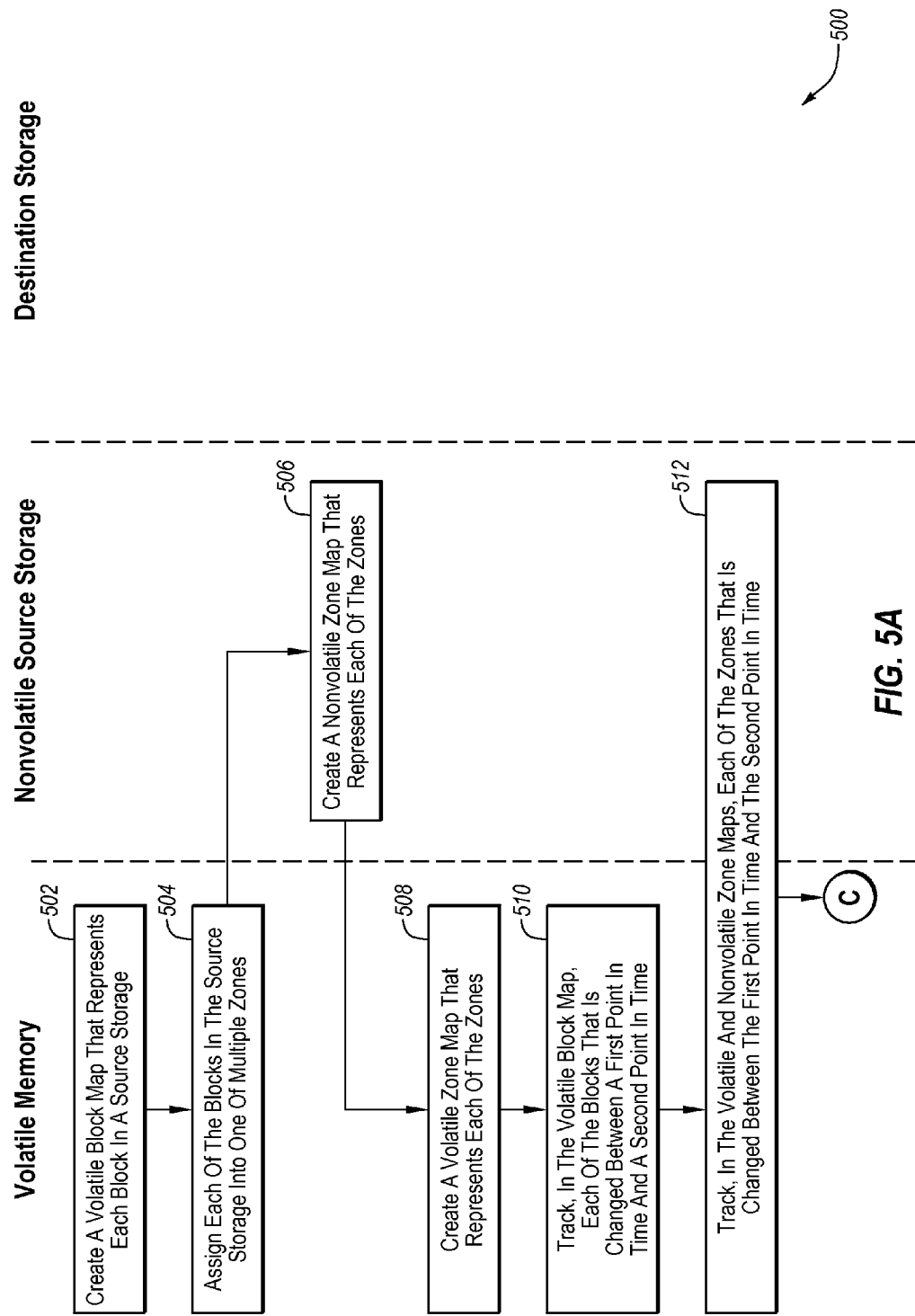
Figure 5B:
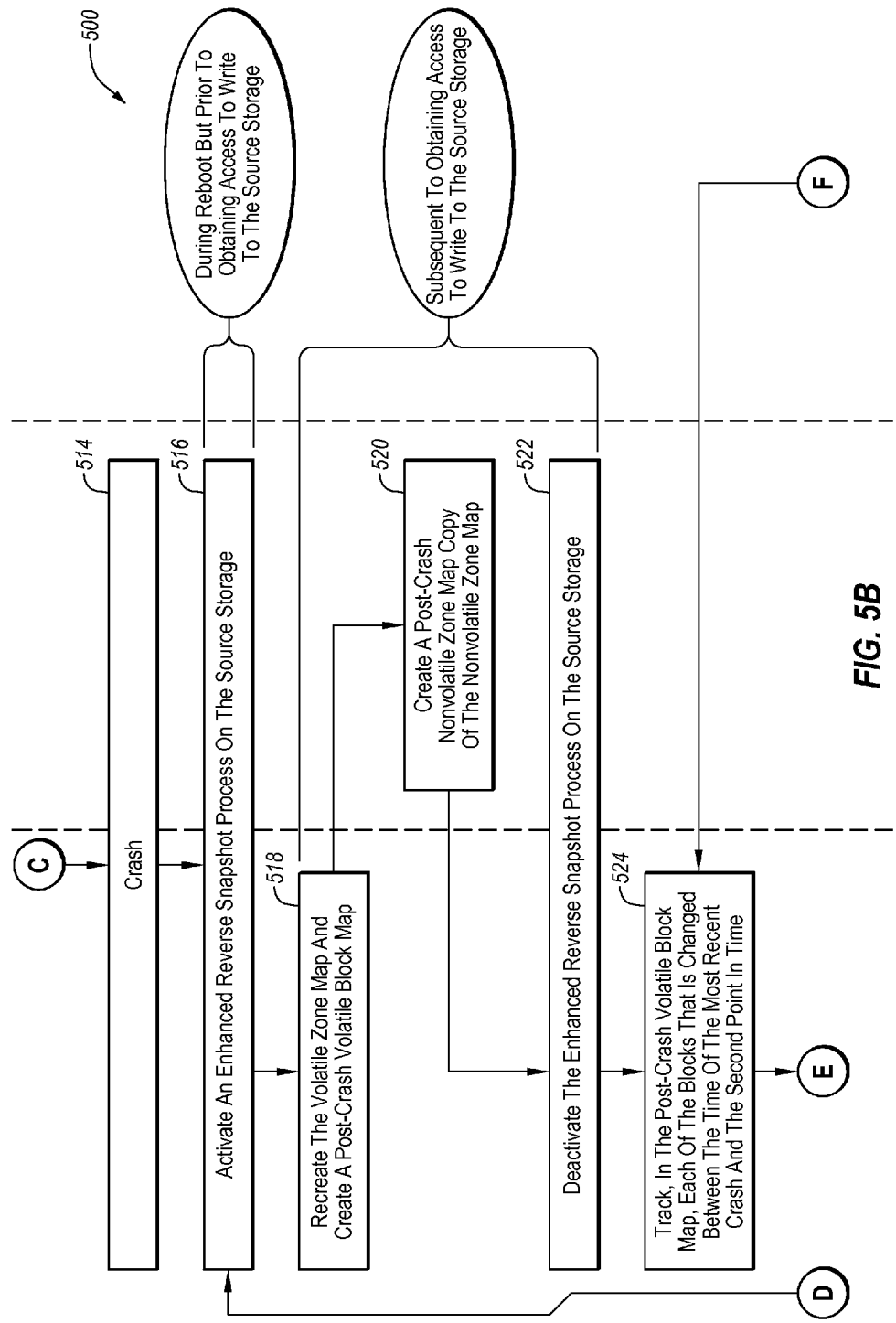

FIGS. 5A-5B are schematic flowchart diagrams of another example method 500 of crash-tolerant incremental change tracking between backups of a source storage. Like the method 400, the method 500 may be implemented, in at least some embodiments, by the backup module 116 of the source system 102 of FIG. 1. For example, the backup module 116 may be configured to execute computer instructions to perform operations of crash-tolerant incremental change tracking between backups of the source storage 106, as represented by one or more of the steps 502-536 of the method 500. Prior to the method 500, various image backup operations of a backup job may have transpired, which will have resulted at least in the creation of a base backup in the destination storage 108 and may have also resulted in the creation of one or more incremental backups in the destination storage 108 (see FIG. 1). Also, prior to the method 500, the volatile block map 120 and the nonvolatile and volatile zone maps 118 and 122 may be reset at time t(1) to represent that no blocks of the source storage 106 have been changed. Although illustrated as discrete steps, various steps may be divided into additional steps, combined into fewer steps, reordered, or eliminated, depending on the desired implementation. The method 500 will now be discussed with reference to FIGS. 1 and 5A-5C.

The method 500 may begin at steps 502-512, which are substantially similar to the steps 402-412, respectively, of the method 400 discussed herein. Therefore, an understanding of the steps 502-512 can be gained from the discussion of, and examples given in connection with, the steps 402-412 herein.

Next, at step 514, a crash may occur. For example, at step 514 an operating system associated with the source storage 106, such as an operating system of the source system 102, may experience an ungraceful loss of power or other crash. At the time of the crash, since the volatile block map 120 is stored in the volatile memory 114 of the source system 102, the volatile block map 120 and the volatile zone map 122 will be lost and cannot, therefore, be employed in determining which blocks in the source storage 106 changed between the time t(1) and the time t(2). However, since the nonvolatile zone map 118 is stored in the nonvolatile source storage 106, the nonvolatile zone map 118 will not be lost at the time of the crash, and can therefore continue to be employed in determining which blocks in the source storage 106 changed between the time t(1) and the time t(2).

After a crash at step 514, the method 500 next proceeds to the step 516 where the operating system is rebooted to continue tracking changes to the source storage. During the reboot but prior to obtaining access to write to the source storage, at step 516 an enhanced reverse snapshot process on the source storage may be activated. The enhanced reverse snapshot process may allow, during the mount of the source storage, each request to write to one of the blocks of the source storage to be pooled in a location other than the location of the block without actually executing the write request and with the write request falsely being reported as successfully executed. The enhanced reverse snapshot may differ from the reverse snapshot discussed above in that the enhanced reverse snapshot may remain active during the creation of a post-crash volatile block map and a post-crash nonvolatile zone map copy, as discussed below.

For example, during reboot of the operating system of the source system 102, the backup module 116 may not initially have access to write to the source storage 106 because the source storage 106 is not yet mounted, and therefore the backup module 116 of FIG. 1 may activate, at step 516, an enhanced reverse snapshot on the source storage 106. During the mounting of the source storage 106, the enhanced reverse snapshot may include the backup module 116 pooling the write requests, instead of allowing write requests to the source storage 106 to be written as requested, until such time as the backup module 116 obtains access to write to the source storage 106 once the source storage 106 is mounted. For example, the backup module 116 may pool a write request by storing the write request in the volatile memory 114 or by writing the write request to a location in the nonvolatile source storage 106 other than the requested location. Once each write request is pooled, the backup module 116 may then falsely report back to the requestor of the write request that the write request successfully executed. This pooling and false reporting of successful execution of a write request is distinct from simply queuing a write request, which may cause the reboot process to pause waiting for the write request to execute. The pooling of write requests by the backup module 116 may be performed in such a way that a read request for any block included in the pool can also be intercepted and the corresponding pooled data can be returned instead of the actual data at the block, which due to the pooling has become invalid. This pooling of write requests may ensure that no changes occur to the source storage 106 prior to the volatile zone map 122 being recreated using the content of the nonvolatile zone map 118.

Next, subsequent to obtaining access to write to the source storage, at step 518 the volatile zone map may be recreated, and a post-crash volatile block map may be created, in volatile memory. The post-crash volatile block map may be similar to the original volatile block map, but it is understood that the post-crash volatile block map is only capable of tracking changes to blocks in the source storage that occurred after the crash at step 514, instead of being capable of tracking all changes to blocks that occurred since the first point in time. Then, at step 520, a post-crash copy of the nonvolatile zone map (referred to herein as the "post-crash nonvolatile zone map copy") may be created. This post-crash nonvolatile zone map copy may be created in order to maintain a copy of only those zones that changed prior to the most recent crash. Next, at step 522, the enhanced reverse snapshot process on the source storage may be deactivated. Deactivating the enhanced reverse snapshot process on the source storage may include, for each pooled write request, marking the block of the pooled write request as changed in the post-crash volatile block map, marking the zone of the pooled write request as changed in the volatile and nonvolatile zone maps if the zone is not marked as changed in the volatile zone map, and subsequently executing the pooled write request in the source storage.

For example, once the backup module 116 of FIG. 1 finally obtains access to write to the source storage 106 due to the source storage 106 being mounted, either during or after the completion of the reboot of the source system 102, the backup module 116 of FIG. 1 may recreate, at step 518, the volatile zone map 122 in the volatile memory 114, by reading the nonvolatile zone map 118 into the volatile memory 114. In this example, the conclusion of the mount operation on the source storage 106 enables the volatile zone map 122 to be recreated in the volatile memory 114 by simply reading the nonvolatile zone map 118 using standard file system calls of the standard file system of the operating system associated with the source storage 106. The use of standard file system calls to recreate the volatile zone map 122 is much simpler than enabling the backup module 116 to read the nonvolatile zone map 118 without the help of the standard file system. Then the backup module 116 of FIG. 1 may then create in the volatile memory 114 a post-crash volatile block map, which may be similar or identical to the newly initialized volatile block map 120 of FIG. 2A. Next, the backup module 116 of FIG. 1 may recreate, at step 520, a post-crash nonvolatile zone map copy in the nonvolatile source storage 106, which may be identical to the nonvolatile zone map 118 at the time of the crash at step 514. Then, the backup module 116 may deactivate, at step 522, the enhanced reverse snapshot on the source storage 106. The deactivating of the enhanced reverse snapshot may include, for each pooled write request, marking the block of the pooled write request as changed in the post-crash volatile block map, marking the zone of the pooled write request as changed, in the nonvolatile and volatile zone maps 118 and 122, if the zone is not already marked as changed in the volatile zone map 122 (since checking the volatile zone map 122 is faster than checking the nonvolatile zone map 118), and subsequently executing the pooled write request in the source storage 106. Once each of the pooled write requests has been executed in the source storage 106, the deactivation of the enhanced reverse snapshot may be completed by the backup module 116 ceasing to pool write requests.

After the enhanced reverse snapshot has been deactivated at step 522, the method 500 next proceeds to the step 524 where each of the blocks that is changed between the time of the most recent crash at step 514 and the second point in time is tracked in the post-crash volatile block map. For example, the backup module 116 of FIG. 1 may track in the post-crash volatile block map, at step 524, each of the blocks that is changed in the source storage 106 between the time of the most recent crash at step 514 and the time t(2).

Next, at step 526, each of the zones that is changed between the first point in time and the second point in time is tracked in the volatile and nonvolatile zone maps. As with the step 512, at the step 526 each of the zones is marked as changed in the volatile and nonvolatile zone maps upon the first receipt of a request to write to any of the blocks of the zone and prior to the execution of the write request. For example, the backup module 116 of FIG. 1 may track, at step 526, each of the zones that is changed in the source storage 106 between the time t(1) and the time t(2), for example, as discussed above in connection with the method 300 of FIG. 3. The step 526 may be performed by the backup module 116 of FIG. 1 prior to the execution of the first write request corresponding to each zone. By tracking each of the zones that is changed between the time t(1) and the time t(2) in the nonvolatile zone map 118, the method 500 can reliably guarantee that the zones marked as changed in the nonvolatile zone map 118 are the only zones that can possibly include changed blocks, even where a crash of the source system 102 has occurred at step 514. As discussed in greater detail below, even in the event of a crash of the source system 102, the method 500 can avoid the time-intensive and resource-intensive full compare of every block in the source storage 106 with corresponding blocks in the base and incremental backups that were previously created and stored in the destination storage 108.

Next, at decision step 528, it may be determined that the second point in time has arrived for creating the 2nd incremental backup of the source storage, that an operating system associated with the source storage has once again crashed, or that neither has occurred. If it is determined at step 528 that the second point in time has arrived for creating the 2nd incremental backup of the source storage (Second Point In Time at 528), then the method 500 may proceed to the step 530. If the second point in time has not arrived, and if it is determined at step 528 that an operating system associated with the source storage has crashed (Crash at 528), then the method 500 may return to the step 516. If it is determined at the step 528 that the second point in time has not arrived and that the operating system has not crashed (Neither at 528), then the method 500 may return to the step 524.

If the second point in time has arrived at step 528 to create the 2nd incremental backup, the method 500 proceeds directly to the steps 530-536 where the post-crash volatile block map and the nonvolatile zone map 118 may be employed together to determine which blocks in the source storage 106 changed between the first point in time and the second point in time.

In particular, at step 530, the blocks in the source storage corresponding to any block marked as changed in the post-crash volatile block map are identified as changed blocks. For example, the backup module 116 may identify, at step 530, the blocks in the source storage 106 that correspond to any block marked as changed in the post-crash volatile block map 120 as changed blocks.

Next, at step 532, the blocks in the source storage assigned to any zone marked as changed in the post-crash nonvolatile zone map copy are identified as potentially changed zone blocks. For example, the backup module 116 may identify, at step 422, the blocks in the source storage 106 that are assigned to any zone marked as changed in the nonvolatile zone map 118 as potentially changed zone blocks. It is understood that where a block is already identified as changed at step 530, that block need not be identified as potentially changed at step 532 and can instead be skipped over for purposes of step 532.

Then, at step 534, the most recently backed-up blocks in one or more prior backups of the source storage that correspond to the potentially changed zone blocks are identified as potentially outdated backup blocks, where the one or more prior backups represent the source storage at the first point in time. For example, the backup module 116 may identify, at step 534, the most recently backed-up blocks that correspond to the potentially changed zone blocks in the base backup and the 1st incremental backup stored in the destination storage 108 as potentially outdated backup blocks.

Finally, at step 536, only the potentially changed zone blocks are compared to the potentially outdated backup blocks to determine which blocks in the source storage changed between the first point in time and the second point in time. For example, the backup module 116 may compare, at step 536, only the potentially changed zone blocks to the potentially outdated backup blocks to determine which of these blocks in the source storage 106 actually changed between the time t(1) and the time t(2), and these actually changed blocks can be appended to the list of changed blocks that were identified at step 530 to create a final list of changed blocks in the source storage 106.

Continuing with the example, by the conclusion of step 536, all blocks in the source storage 106 that were changed between the time t(1) and the time t(2) will have been identified. Even where there have been one or more crashes of the source system 102, these changed blocks will have been reliably identified without performing the time-intensive and resource-intensive full compare of every block in the source storage 106 with corresponding blocks in the base and incremental backups that were previously stored in the destination storage 108. Further, the post-crash volatile block map and the post-crash nonvolatile zone map copy can be employed together to reliable identify changed blocks without performing the time-intensive and resource-intensive full compare of any blocks in the source storage 106 with corresponding blocks in the base and incremental backups that were previously stored in the destination storage 108 that were changed since the time of the most recent crash of the source system 102, and of any zones of blocks that were only changed since the time of the most recent crash of the source system 102.

It is understood that the foregoing discussion of the method 500 is but one possible implementation of a method of crash-tolerant incremental change tracking between backups of a source storage, and various modifications are possible and contemplated. For example, the method may be modified to combine the functionality of the post-crash volatile block map and the post-crash nonvolatile zone map copy. This combined functionality may be accomplished by employing a single post-crash volatile block map that distinguishes between pre-crash potentially changed blocks and post-crash changed blocks, that initially marks all blocks of all changed zones and pre-crash potentially changed blocks, and subsequently tracks all changes to blocks as post-crash changed blocks. Then, at the step 530 the post-crash changed blocks can be identified as changed, and at steps 532-536 the pre-crash potentially changed blocks can be compared to the corresponding blocks in the prior backup(s) to determine which of the potentially changed blocks actually changed. Thus, in some example embodiments, the post-crash volatile block map may be exclusively employed or employed with the post-crash nonvolatile zone-map copy. Continually tracking changes to zones in the volatile and nonvolatile zone maps in the step 526 may be necessary in the event that more than one crash occurs, as a crash may occur at the step 528 one or more times. The embodiment disclosed in the method 500 allows for two intermediate solutions (between simply reading from a volatile block map and a performing a full compare) in the event of one or more crashes of 1) using only the post-crash nonvolatile zone map copy (where no changes have occurred subsequent to the most recent crash) and 2) using the post-crash nonvolatile zone map copy in combination with the post-crash volatile block map in the event of a crash. Further, the steps 510 and 512 and/or the steps 524 and 526 may be reversed.

Also, although the methods 300, 400, and 500 are discussed in the above example as being performed exclusively by the backup module 116, it is understood that the methods 300, 400, and 500 may alternatively be performed by the backup module 110, by some combination of the backup module 116 and the backup module 110, or by some other module or combination of modules. Further, it is understood that although the nonvolatile zone map is disclosed in FIGS. 4A-4B and 5A-5C as being stored in a nonvolatile source storage, in some embodiments the nonvolatile zone map may instead be stored in a nonvolatile storage that is different from the source storage of the methods 400 and 500, such as a remotely accessible destination storage or a storage that is locally accessible to the source storage. Further, the blocks that store the nonvolatile zone map and/or the post-crash nonvolatile zone map copy may be marked as unmovable in a file system associated with the nonvolatile storage.

The embodiments described herein may include the use of a special purpose or general purpose computer, including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose computer, special purpose computer, or virtual computer such as a virtual machine. Combinations of the above may also be included within the scope of computer-readable media.

Computer-executable instructions comprise, for example, instructions and data which cause a general purpose computer, special purpose computer, or virtual computer such as a virtual machine to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method of crash-tolerant incremental change tracking between backups of a source storage, the method comprising:
    assigning each block in a source storage into one of multiple zones, each of the zones including multiple of the blocks;
    creating, in a nonvolatile storage, a nonvolatile zone map that represents each of the zones;
    tracking, in the nonvolatile zone map, each of the zones that is changed between a first point in time and a second point in time, each of the zones being marked as changed in the nonvolatile zone map upon the first receipt of a request to write to any of the blocks of the zone and prior to execution of the write request; and
    upon a crash of an operating system associated with the source storage and during a reboot of the operating system after the crash but prior to obtaining access to write to the source storage, activating a reverse snapshot process on the source storage to allow the source storage to be mounted while each request to write to one of the blocks of the source storage is pooled in a location other than the location of the block without actually executing the write request and with the write request falsely reported as successfully executed.

2. The method as recited in claim 1, wherein the nonvolatile zone map comprises:
    a zone bitmap including a bit corresponding to each of the zones of the source storage; or
    a run-length encoded list of bits including a bit corresponding to each of the zones of the source storage.

3. The method as recited in claim 1, wherein:
    the nonvolatile storage is locally accessible to the source storage, or
    the nonvolatile storage is remotely accessible to the source storage.

4. The method as recited in claim 1, wherein the nonvolatile storage is the source storage.

5. The method as recited in claim 1, wherein subsequent to obtaining access to write to the source storage, the method further comprises:
    deactivating the reverse snapshot process on the source storage by marking the zone of each pooled write request as changed, in the nonvolatile zone map, if the zone is not marked as changed in the nonvolatile zone map and subsequently executing the pooled write request in the source storage; and
    continuing the tracking, in the nonvolatile zone map, of each of the zones that is changed between the first point in time and the second point in time.

6. One or more non-transitory computer-readable media storing one or more programs that cause one or more processors to execute the method as recited in claim 1.

7. A method of crash-tolerant incremental change tracking between backups of a source storage, the method comprising:
    creating, in a volatile memory, a volatile block map that represents each block in a source storage;
    assigning each of the blocks in the source storage into one of multiple zones, each of the zones including multiple of the blocks;
    creating, in the source storage, a nonvolatile zone map that represents each of the zones;
    tracking, in the volatile block map, each of the blocks that is changed between a first point in time and a second point in time; and
    tracking, in the nonvolatile zone map, each of the zones that is changed between the first point in time and the second point in time, each of the zones being marked as changed in the nonvolatile zone map upon the first receipt of a request to write to any of the blocks of the zone and prior to execution of the write request,
    wherein at the second point in time and subsequent to a crash of an operating system associated with the source storage, the method further comprises:
        identifying, as potentially changed zone blocks, the blocks in the source storage assigned to any zone marked as changed in the nonvolatile zone map;
        identifying, as potentially outdated backup blocks, the most recently backed-up blocks in one or more prior backups of the source storage that correspond to the potentially changed zone blocks, the one or more prior backups representing the source storage at the first point in time; and
        comparing only the potentially changed zone blocks to the potentially outdated backup blocks to determine which blocks in the source storage actually changed between the first point in time and the second point in time.

8. The method as recited in claim 7, wherein the volatile block map comprises:
    a block bitmap including a bit corresponding to each of the blocks in the source storage, or
    a run-length encoded list of bits including a bit corresponding to each of the blocks of the source storage.

9. The method as recited in claim 7, wherein upon the crash of the operating system associated with the source storage and during a reboot of the operating system after the crash but prior to the second point in time and prior to obtaining access to write to the source storage, the method further comprises:
    activating a reverse snapshot process on the source storage to allow the source storage to be mounted while each request to write to one of the blocks of the source storage is pooled in a location other than the location of the block without actually executing the write request and with the write request falsely reported as successfully executed.

10. The method as recited in claim 9, wherein subsequent to obtaining access to write to the nonvolatile zone map but prior to the second point in time, the method further comprises:
    deactivating the reverse snapshot process on the source storage by, for each pooled write, marking the zone of the pooled write request as changed in the nonvolatile zone map if the zone is unmarked as changed in the nonvolatile zone map, and subsequently executing the pooled write request in the source storage; and continuing the tracking, in the nonvolatile zone map, of each of the zones that is changed between the first point in time and the second point in time.

11. One or more non-transitory computer-readable media storing one or more programs that cause one or more processors to execute the method as recited in claim 7.

12. A method of crash-tolerant incremental change tracking between backups of a source storage, the method comprising:
   creating, in a volatile memory, a volatile block map that represents each block in a source storage;
   assigning each of the blocks in the source storage into one of multiple zones, each of the zones including multiple of the blocks;
   creating, in the source storage, a nonvolatile zone map that represents each of the zones, blocks in the source storage that store the nonvolatile zone map being marked as unmovable in a file system associated with the source storage;
   creating, in the volatile memory, a volatile zone map that represents each of the zones;
   tracking, in the volatile block map, each of the blocks that is changed between a first point in time and a second point in time; and
   tracking, in the volatile and nonvolatile zone maps, each of the zones that is changed between the first point in time and the second point in time, each of the zones being marked as changed in the volatile and nonvolatile zone maps upon the first receipt of a request to write to any of the blocks of the zone and prior to execution of the write request.

13. The method as recited in claim 12, wherein the tracking in the volatile and nonvolatile zone maps is performed by:
   intercepting a request to write to one of the blocks;
   determining the zone to which the block is assigned;
   checking whether the zone is marked as changed in the volatile zone map;
   where the zone is marked as changed in the volatile zone map, executing the intercepted write request without updating the volatile zone map nor the nonvolatile zone map; and
   where the zone is not marked as changed in the volatile zone map, marking the zone as changed in the volatile and nonvolatile zone maps prior to executing the intercepted write request.

14. The method as recited in claim 12, wherein upon a crash of an operating system associated with the source storage and during a reboot of the operating system after the crash but prior to obtaining access to write to the source storage, the method further comprises:
   activating an enhanced reverse snapshot process on the source storage to allow the source storage to be mounted while each request to write to one of the blocks of the source storage is pooled in a location other than the location of the block without actually executing the write request and with the write request falsely reported as successfully executed.

15. The method as recited in claim 14, wherein subsequent to obtaining access to write to the source storage, the method further comprises:
   recreating, in the volatile memory, the volatile zone map;
   creating, in the volatile memory, a post-crash volatile block map;
   creating, in the nonvolatile memory, a post-crash nonvolatile zone map copy;
   deactivating the enhanced reverse snapshot process on the source storage by, for each pooled write request, marking the block of the pooled write request as changed in the post-crash volatile block map, marking the zone of the pooled write request as changed in the volatile and nonvolatile zone maps if the zone is not marked as changed in the volatile zone map, and subsequently executing the pooled write request in the source storage;
   tracking, in the post-crash volatile block map, each block that is changed between the time of the most recent crash and the second point in time; and
   continuing the tracking, in the volatile and nonvolatile zone maps, of each of the zones that is changed between the first point in time and the second point in time.

16. The method as recited in claim 12, wherein at the second point in time and subsequent to a crash of an operating system associated with the source storage, the method further comprises:
   identifying, as changed blocks, the blocks in the source storage corresponding to any block marked as changed in the post-crash volatile block map;
   identifying, as potentially changed zone blocks, the blocks in the source storage assigned to any zone marked as changed in the post-crash nonvolatile zone map copy but excluding the blocks marked as changed in the post-crash volatile block map;
   identifying, as potentially outdated backup blocks, the most recently backed-up blocks in one or more prior backups of the source storage that correspond to the potentially changed zone blocks, the one or more prior backups representing the source storage at the first point in time; and
   comparing only the potentially changed zone blocks to the potentially outdated backup blocks to determine which additional blocks in the source storage actually changed between the first point in time and the second point in time.

17. One or more non-transitory computer-readable media storing one or more programs that cause one or more processors to execute the method as recited in claim 12.

18. A method of crash-tolerant incremental change tracking between backups of a source storage, the method comprising:
   assigning each block in a source storage into one of multiple zones, each of the zones including multiple of the blocks;
   creating, in a nonvolatile storage, a nonvolatile zone map that represents each of the zones, blocks in the nonvolatile storage that store the nonvolatile zone map being marked as unmovable in a file system associated with the nonvolatile storage; and
   tracking, in the nonvolatile zone map, each of the zones that is changed between a first point in time and a second point in time, each of the zones being marked as changed in the nonvolatile zone map upon the first receipt of a request to write to any of the blocks of the zone and prior to execution of the write request.

19. The method as recited in claim 18, wherein the method further comprises:
   upon a crash of an operating system associated with the source storage and during a reboot of the operating system after the crash but prior to obtaining access to write to the source storage, activating a reverse snapshot process on the source storage to allow the source storage to be mounted while each request to write to one of the blocks of the source storage is pooled in a location other than the location of the block without actually executing the write request and with the write request falsely reported as successfully executed; and subsequent to obtaining access to write to the source storage, deactivating the reverse snapshot process on the source storage by marking the zone of each pooled write request as changed, in the nonvolatile zone map, if the zone is not marked as changed in the nonvolatile zone map, subsequently executing the pooled write request in the source storage, and continuing the tracking, in the nonvolatile zone map, of each of the zones that is changed between the first point in time and the second point in time.

20. The method as recited in claim 18, wherein at the second point in time and subsequent to a crash of an operating system associated with the source storage, the method further comprises:

identifying, as potentially changed zone blocks, the blocks in the source storage assigned to any zone marked as changed in the nonvolatile zone map;

identifying, as potentially outdated backup blocks, the most recently backed-up blocks in one or more prior backups of the source storage that correspond to the potentially changed zone blocks, the one or more prior backups representing the source storage at the first point in time; and comparing only the potentially changed zone blocks to the potentially outdated backup blocks to determine which blocks in the source storage actually changed between the first point in time and the second point in time.

21. One or more non-transitory computer-readable media storing one or more programs that cause one or more processors to execute the method as recited in claim 18.

* * * * *